Feb. 8, 1966 W. F. BREWER 3,233,685
ROTARY TILLER
Filed March 8, 1963 9 Sheets-Sheet 1

INVENTOR
WILLIE F. BREWER

BY *Scrivener & Parker*
ATTORNEYS

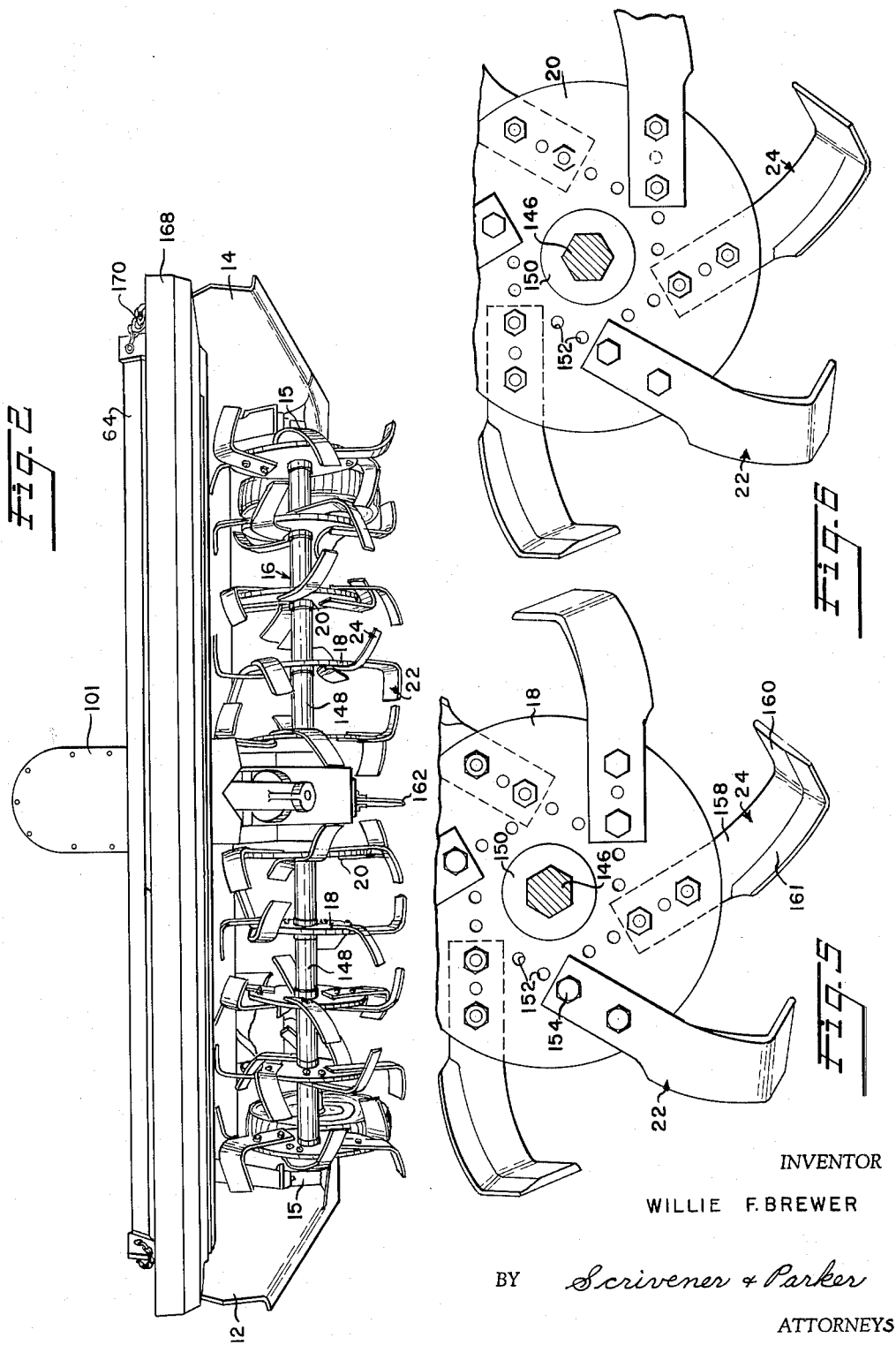

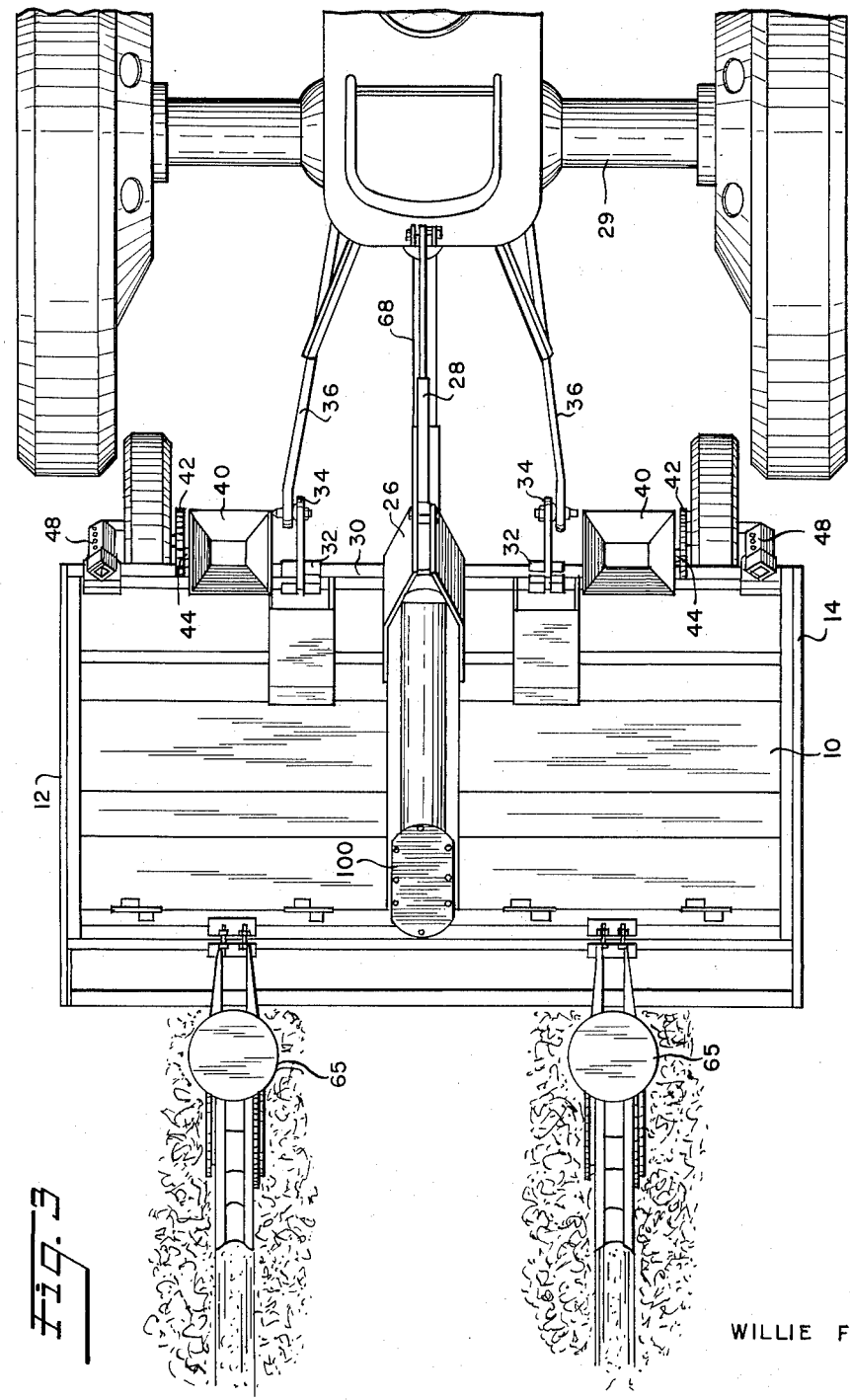

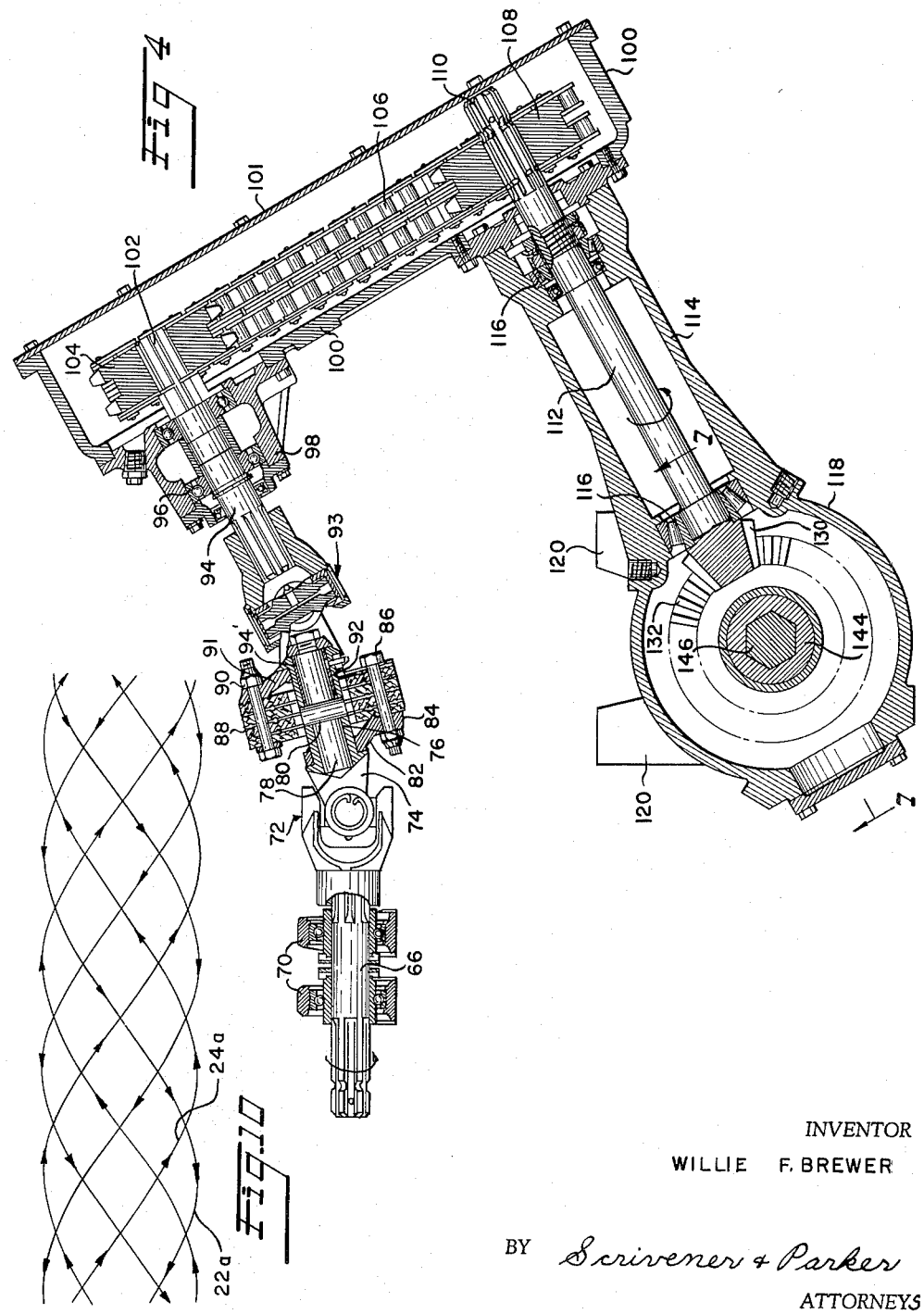

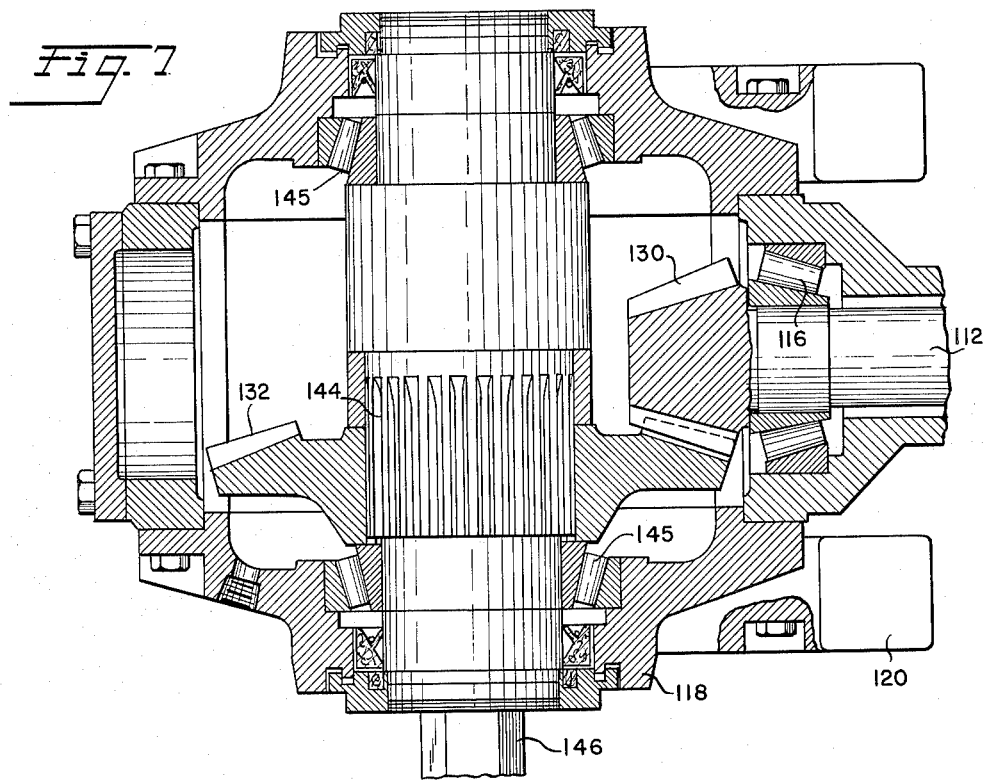
Fig. 7
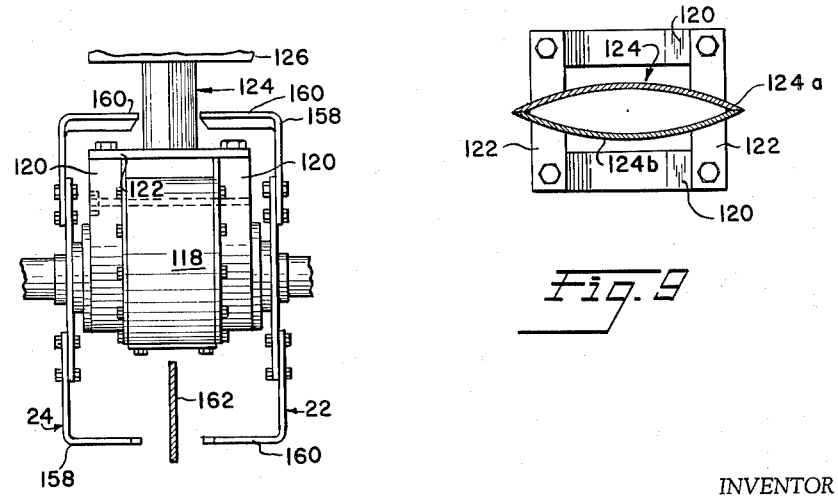
Fig. 8
Fig. 9
INVENTOR
WILLIE F. BREWER
BY *Scrivener & Parker*
ATTORNEYS

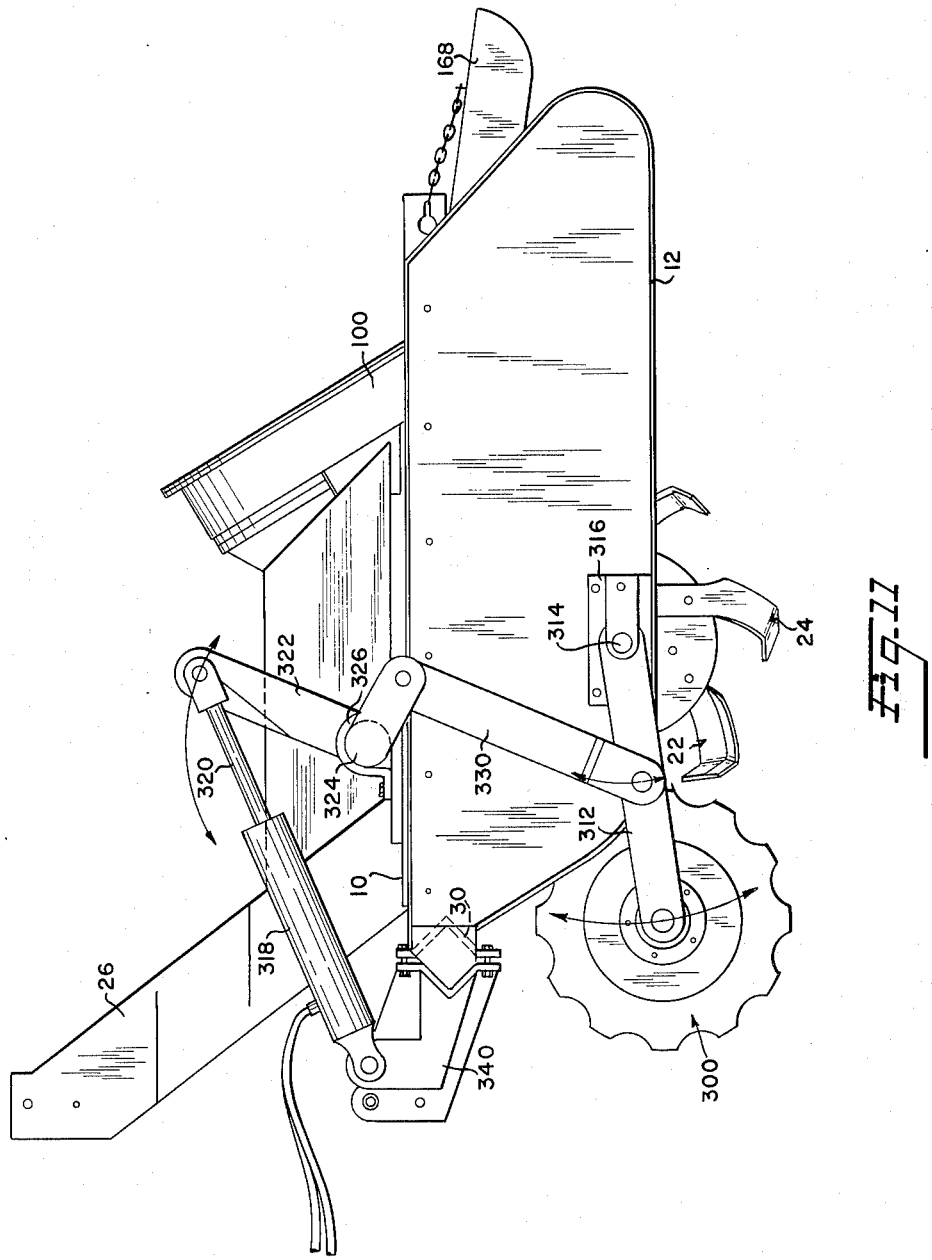

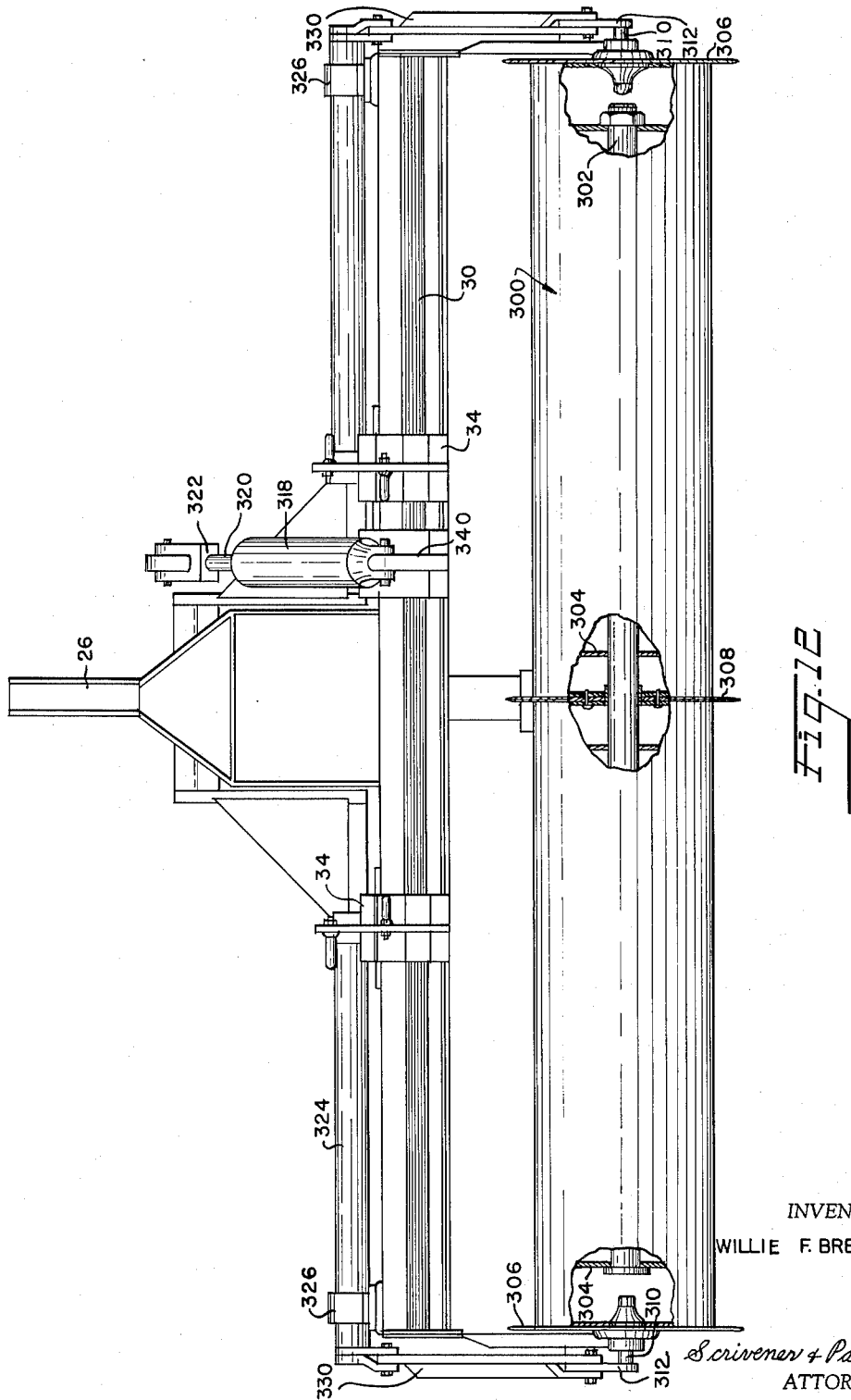

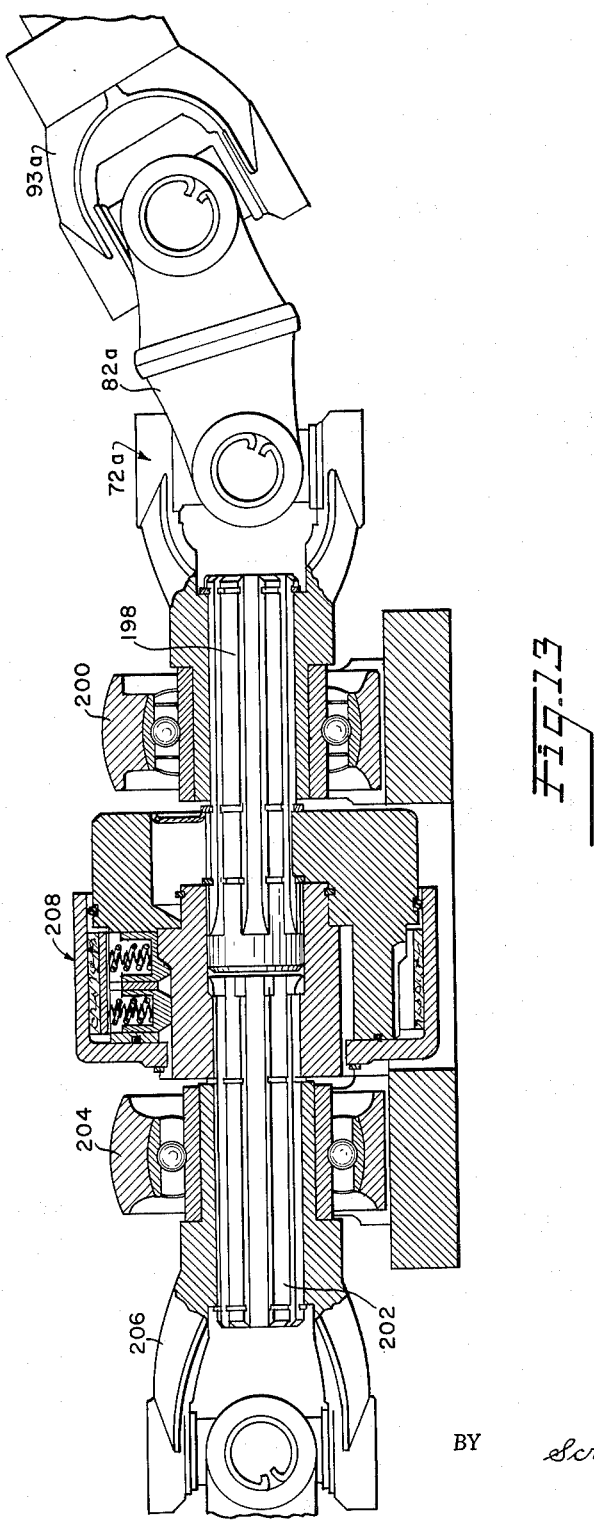

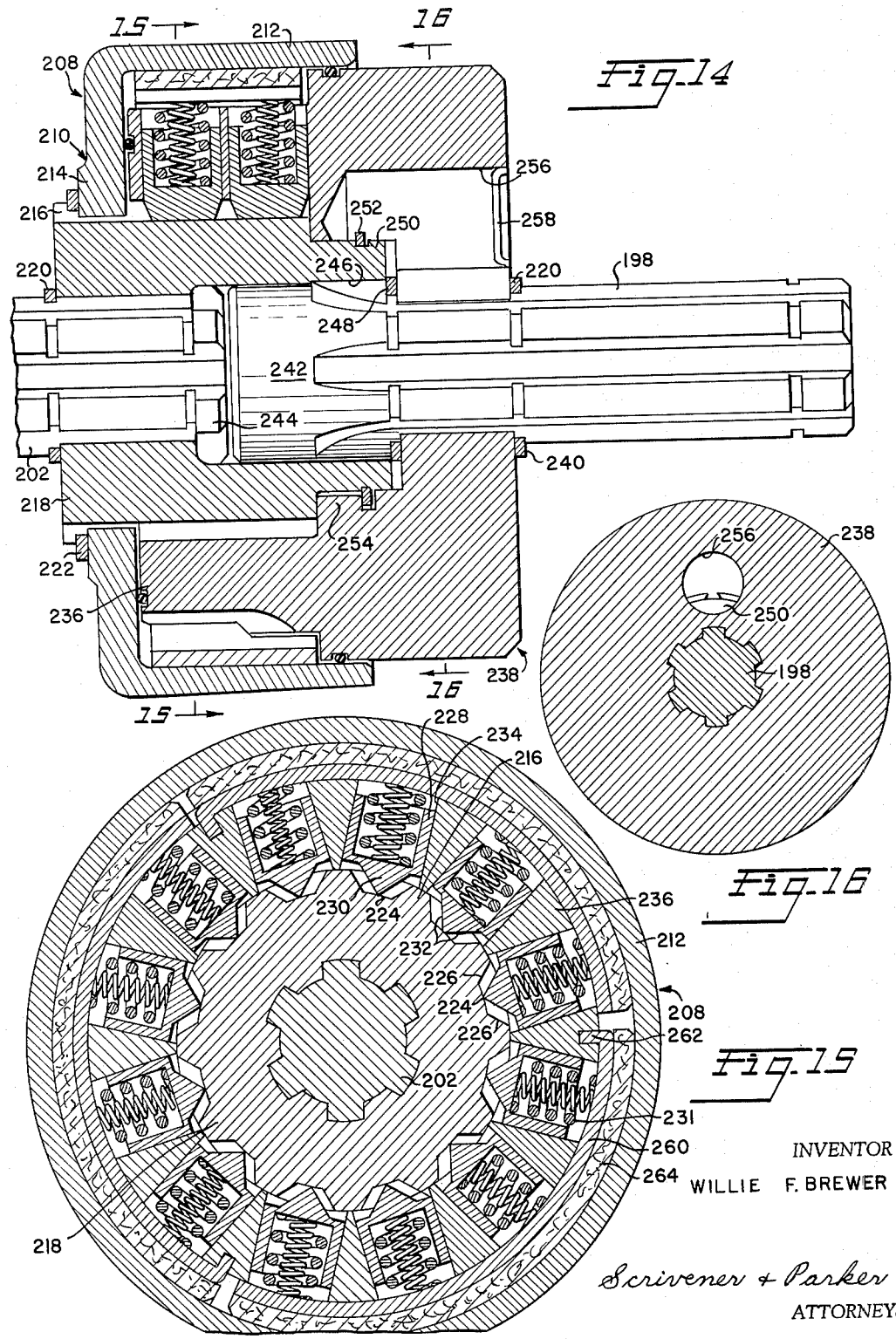

United States Patent Office 3,233,685
Patented Feb. 8, 1966

3,233,685
ROTARY TILLER
Willie F. Brewer, Minden, La., assignor to Dealer Associates, Inc., Minden, La., a corporation of Louisiana
Filed Mar. 8, 1963, Ser. No. 265,308
8 Claims. (Cl. 172—119)

This invention relates to tilling apparatus and more particularly to improved tilling apparatus of the rotary plow variety.

Formerly, the trend in ground working of crop fields had followed the view that more acreage per day could be worked by the mere multiplication of conventional ground working implements. For example, in order to plow more acres in a given period of time, it was thought only necessary to attach more conventional plows to the rear of a tractor, and as the number of plows was increased it was then only necessary to increase the size and weight of the tractor. Though this plan appear logical, in practice it was found that a point of diminishing return was reached whereby the immense size and weight of the tractor so compacted the ground ahead of the plow that still greater horse power and weight was required merely to overcome the additional compaction caused by the towing equipment, and during rainy seasons no plowing whatever could be accomplished. Additionally, the expense of the immensely powerful and heavy equipment became so prohibitive that it frequently more than offset whatever gains were made in increased acreage.

In recent years, the foregoing problems have been recognized and a theory was evolved whereby the tractor should be considered as a mobile support for a power plant, i.e. the tractor engine, which would operate rearwardly of the tractor to drive an entirely different type of implement which would be capable of working the ground as well as propelling the implement in its directions of travel. Under this concept, the tractor, instead of being a pulling means now served primarily as braking means whereby the implement pushes ahead against the tractor and the forward speed of the latter is controlled by the braking action of the tractor drive gear train. Thus it will be seen that by following this new concept the tractor need not be immensely heavy in order to insure enough frictional contact with the ground to pull the implements but instead the tractor can be as light as possible and the frame thereof need be only sufficiently strong to support the tractor engine. This new concept vastly decreased the cost of the equipment while at the same time made it possible for the equipment to be used under a wide range of weather conditions.

A significant ground working implement evolved under the foregoing theory was the rotary tiller or plow which generally comprised a frame disposed rearwardly of the tractor and having a lateral shaft positively driven from the power take off (hereinafter referred to as the P.T.O.) and carrying a plurality of spaced discs having earth working tines or blades projecting radially therefrom and which, when rotated in a direction tending to drive the implement forwardly serve to break up the soil and place it in a condition in substantial readiness for planting without further working. Heretofore, rotary tillers or plows in general use have relied on drive means which operates at one end of the lateral shaft in order to avoid central untilled strips which might occur were the drive means to be located centrally of the shaft, that is to say, in substantial alignment with the P.T.O. shaft of the tractor.

The end mounted drive means receives power from the P.T.O. shaft by way of an elevated gear box centrally mounted on the frame of the implement and a laterally extending power transmitting means is interposed between the centrally mounted gear box and the drive for the lateral shaft at the side of the implement. This arrangement has numerous disadvantages among which is the loss of efficiency in the complex mechanism required in transferring the power of the P.T.O. shaft to a position spaced laterally some distance away from the axis of the P.T.O. shaft. Additionally, the side mounted drive unbalances the implement on the side thereof carrying the drive and because the entire shaft is driven from one end only, it will be apparent that there is a large reaction torque at the opposite end of the shaft as the tines impinge on the ground. This tends to produce whipping and tortional flexing of the shaft conducive to fatigue failure, so that more massive components and greater power are required than would be the case were the shaft to be driven from an optimum position more nearly in alignment with the P.T.O. shaft.

It is a broad object of the present invention to provide a new and improved rotary tiller or plow which overcomes all of the foregoing disadvantages of plows presently in use.

More particularly, it is an object of the invention to provide an improved drive means for the laterally extending blade carrying shaft which has all the advantages of being in alignment with the P.T.O. shaft of the tractor including central support for the transverse shaft, while eliminating the problem of an untilled strip at the center of the implement.

Other objects of the invention are: to provide in a rotary tiller means for quickly and easily changing the ratio of blade speed to P.T.O. shaft speed; to provide improved blades and blade supporting means including means whereby the depth of till may be varied uniformly across the entire width of till or may be varied in an undulating pattern so as to provide laterally spaced elevated rows as the implement advances; and to provide means whereby the tiller can have attached thereto auxiliary implements such as planters and the like which can serve to sow the crop simultaneously with the working of the field.

Other objects and their attendant advantages will become apparent as the following detailed description is read in conjunction with the accompanying drawings wherein:

FIG. 2 is a rear elevational view of the rotary tiller of the invention;

FIG. 3 is a top plan view of the present invention and showing the manner in which auxiliary equipment may be employed with the present invention;

FIG. 4 is an enlarged cross sectional view of the drive mechanism of the present invention;

FIGS. 5 and 6 are enlarged detailed views showing the manner by which the blades are attached to the blade carrying disc;

FIG. 7 is an enlarged view showing details of the mechanism by which power is transmitted to the transverse blade carrying shaft;

FIG. 8 is a reduced partial elevational view looking in the direction of the arrows 8—8 in FIG. 1;

FIG. 9 is a vertical cross sectional view taken substantially on the line 9—9 of FIG. 1;

FIG. 10 is a reduced schematic view showing the paths generated by the blades during operation;

FIG. 11 is a vertical side elevational view of a second embodiment of the present invention;

FIG. 12 is a vertical front elevational view, with parts broken away, of the embodiment of FIG. 11;

FIG. 13 is a vertical cross sectional view of a second embodiment of power transmitting mechanism, including novel over-load clutch means, which may be employed with the tiller of the present invention;

FIG. 14 is an enlarged longitudinal cross sectional view of the over-load clutch means shown in FIG. 13;

FIG. 15 is a vertical cross sectional view taken substantially on the line 15—15 of FIG. 14; and FIG. 16 is a vertical cross sectional view taken substantially on the line 16—16 of FIG. 14.

Figure 1:
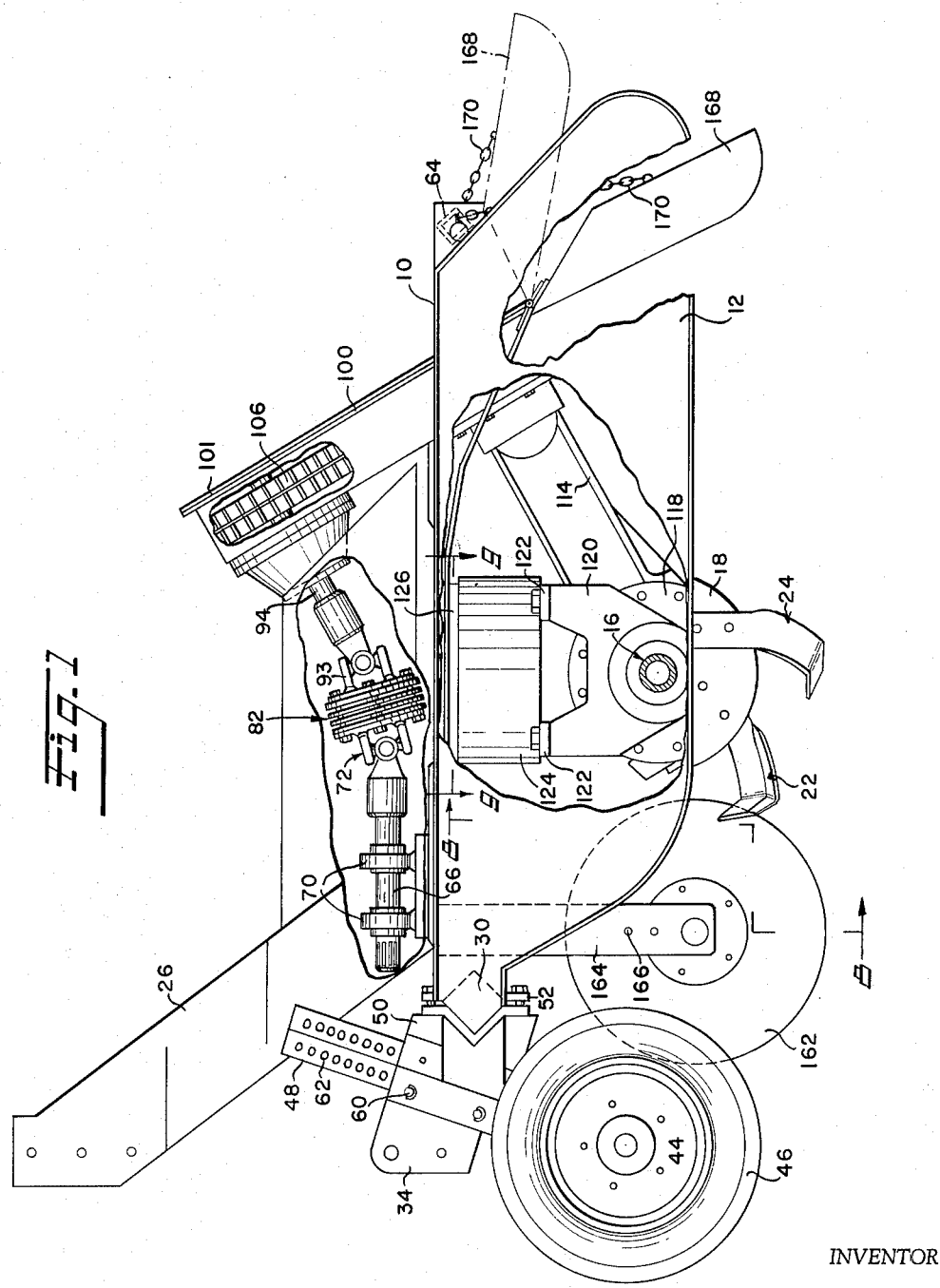
FIG. 1 is a vertical side elevational view, with parts broken away, showing a preferred embodiment of the present invention.

Referring now to the drawings and particularly to FIGS. 1, 2 and 3 the rotary plow of the invention comprises a body having a top deck 10 and a pair of laterally spaced side walls 12, 14 each carrying on the inner side adjacent its lower edge a bearing 15 adapted to receive the outer ends of a transverse shaft member 16 carrying in spaced relationship thereon a plurality of alternately arranged discs 18, 20 carrying oppositely extending ground working teeth or tines 22, 24. The shaft member 16, discs 18, 20 and blades 22, 24 are hereinafter described in greater detail.

Rigidly fixed to the forward end of the upper surface of the deck 10 are a pair of upstanding arms 26, whose upper ends are adapted to receive one end of a turn buckle 28 (see FIG. 3) conventionally used in the usual three point lift operated from the tractor 29. Extending transversally across the front end of the implement is a mounting bar 30 of preferably square cross section adapted to adjustably receive suitable brackets 32 having integral therewith forwardly extending arms 34 for pivotally receiving the outer ends of lift arms 36 of a conventional three point lift which needs not be further described, it being sufficient to say that when a lift cylinder (not shown) is operated on the tractor 29 a piston is extended or retracted to raise or lower the implement between transport and working position in a manner well recognized by those skilled in the art.

With particular reference to FIG. 3, in addition to permitting lateral adjustment of the lift arm brackets 32, the transverse bar 30 also permits the mounting, ahead of the implement, of auxiliary devices such as the seeders generally indicated by the numeral 40. In the event the auxiliary equipment 40 is of a mechanically driven type, drive gearing 42 thereof may be suitably meshed with auxiliary pinions (not shown) removably mounted on the free ends of axles 44 mounting depth control wheels 46 and carried at the lower ends of vertically adjustable wheel posts 48 received in brackets 50 which may be clamped by clamp members 52 to the transverse bar 30 as shown in FIG. 1. It will be apparent from an inspection of FIG. 1 that if desired the brackets 50 could be mounted rearwardly of the shaft 30 by merely reversing the brackets 52 so that the wheels 46 operate behind the bar 30 but regardless of the positioning the wheel 46 it will be apparent that when they are lowered to and fixed in a predetermined position, they serve to prevent the tines from digging into the surface of the earth beyond a predetermined depth.

The wheels may be locked in their adjusted position by the use of pins 60 which may extend through holes in the bracket 50 registrable with a series of holes 62 in the wheel post 48. Though the wheel 46 is shown equipped with a pneumatic tire, those skilled in the art will recognize that other types of depth control wheels might be utilized, as for example, cylindrical metal wheels equipped with coulter-like side flanges which penetrate the earth and serve to minimize side sway of the implement when working on rough terrain.

In addition to the transverse mounting bar 30 at the forward end of the implement, the rear end of the implement may also have a transverse bar 64 substantially identical to the bar 30 and adapted to receive auxiliary apparatus such as the seed planters 65 illustrated in FIG. 3. The planters 65 form no part of the present invention, but merely illustrate the manner in which the mounting bar 64 may be employed.

The means for operating the transverse shaft member 16 carrying the blade discs 18, 20 from the P.T.O. will now be described. With particular reference to FIGS. 1 and 4, the drive includes a stub shaft 66 whose forward end is suitably splined to receive the rear universal joint (not shown) of a conventional telescoping drive shaft 68 (see FIG. 3) whose forward end is connected by a second universal drive (not shown) to the P.T.O. shaft. The stub shaft 66 is rotatably mounted in a pair of pillow bearings 70 with the rear end thereof being equipped with a universal joint 72 whose output side 74 includes an integral hollow extension 76 into which is received the forward end of a short shaft 78 provided with a central collar 80 whose forward annular surface is welded to the rear annular surface of the hollow extension 76. Welded to the exterior of the extension 76 is a spider 82 having arms 84 displaced 120° apart and adapted to receive bolts 86 extending through a series of stacked, resilient, shock absorbing rings 88 which also have extending therethrough a second series of bolts 90 which are received in the arms of a second spider 91 welded to a hollow extension 92 on the input side of a second universal joint 93. The rear part of the shaft 78 is surrounded by a bushing 94' fixed in the hollow extension 92 and adapted to slideably receive the rear end of the shaft 78. Those skilled in the art will recognize that the spiders 82, 91 with the rings 88 constitute a well known flexible coupling with the shaft 78 serving to prevent any tendency of the extensions 76, 92 of the respective universal joint parts 74, 94 to move out of alignment with each other while still receiving the shock absorbing benefits of the resilient rings.

Received in a splined hollow extension on the output side of the universal joint 93 is a stub shaft 94 operating in bearings 96 in a housing 98 fixed to the forward side of a housing 100 which is fixed to the body of the implement at an acute angle with respect to a vertical plane whereby the stub shaft 94 projects rearwardly and upwardly into the housing 100. The housing 100 is provided with a cover 101 and the projecting end 102 of shaft 94 is splined to receive a sprocket wheel 104 which, in accordance with the invention, may be retained on the shaft end 102 solely under the influence of gravity. A sprocket chain 106 engages the wheel 104 as well as a lower sprocket wheel 108 which is also retained by gravity on the splined rear end 110 of a shaft 112 which extends downwardly and forwardly through a housing 114 equipped with suitable bearings 116 at the opposite ends thereof.

The forward end of the shaft 112 extends into a gear box 118 having vertical brackets 120 adapted to be screwed to the laterally projecting ends of a pair of flat longitudinally spaced bars (see FIGS. 1, 8 and 9) welded to the underside of a support member 124 having a double ended configuration in the fore and aft plane, for purposes that will be described, and which is welded at its upper end to a plate 126 rigidly fixed to the underside of the deck 10. This arrangement with the housing 114 provides rigid three point support for the gear box housing.

With reference now to FIGS. 4 and 7, the forward end of the shaft 112 carries a beveled pinion 130 meshing with a bevel ring gear 132 splined to a shouldered sleeve 144 having a hexagonal axial passage therethrough adapted to receive the center portion of an elongated hexagonal rod 146. Bearings 145 between the side walls of the housing and the shouldered ends of the sleeve 144 serve as a center support for the aforementioned transverse shaft member 16, of which the hexagonal rod 146 is a major component as will be apparent as the description proceeds.

The rod 146 forms the core of the transverse shaft member 16 which is of composite construction and includes the hexagonal rod 146 and a plurality of spacer elements 148 (see FIG. 2) having hexagonal passages therethrough and adapted to register with laterally extending collars 150 also provided with hexagonal passages (see FIGS. 5 and 6) fixed to opposite sides of each of the discs 18, 20. It will be apparent that when the sloping shaft 112 is rotated to drive the ring gear 132 counter-clockwise in FIG. 4, the hex-shaped shaft 146 is likewise driven through the splined sleeve 144 to rotate the discs in an earth working direction; that is to say, in a direction tending to propel the implement in its direction of travel.

In order to achieve thorough pulverization of the worked earth, it is desirable that the earth-working parts of the tines be arranged in overlapping relationship; that is to say, when one tooth has completed its sweep through the earth, it is desirable that the path followed by the next succeeding tooth on an adjacent disc at least partly overlap the path followed by the first tooth. In order for this result to be achieved across the entire lateral width of the implement, it will be apparent that the tines must be positioned in rotational staggered or indexed relationship with respect to each other and it follows from this that, unless provision is made to the contrary, the teeth during rotation would generate a helix, hereinafter referred to as a "scroll," extending from one side of the implement to the other with the result that as the blades are rotated the earth would, in a sense, be screwed laterally outwardly to one side of the implement depending upon direction of scroll pitch.

This problem has previously been recognized and has been solved by providing, in effect, two sets of oppositely directed blades each of which develops a scroll whose pitch is opposed to the other. Thus it will be seen that any tendency of one scroll to propel earth laterally through screw action is simultaneously counter-acted by the action of the other scroll with the net result that there is no tendency whatever to expel the worked earth laterally of the machine. FIG. 10 is a schematic depiction of the oppositely pitched scrolls achieved by the present invention and important features of the invention are the provision of improved blades and mounting means therefore which achieve scroll balance while permitting a wide range of blade adjustment. In FIG. 10, the arrows on the respective sets of helices 22a and 24a indicate the directions in which the teeth of the tines extend.

With particular reference to FIGS. 5 and 6, the aforementioned discs 18, 20 are of substantially identical construction with the sole exception that the hex-shaped passage through the center of one disc 20 is rotated 30° with respect to the passage through the second disc 18 in relation to a series of somewhat tangentially arranged mounting holes 152 through the discs. With this arrangement, it can be seen that the discs 18, 20 prior to the formation of the hex passages, can be constructed identically including the drilling or punching of the series of holes 152, and as a final step the hex passages are produced, with the passage in one set of discs being rotated with respect to the series of holes 30° in relationship to the hex hole in the second set of discs. It will thus be seen that with this arrangement when the discs are mounted in alternate relationship on the hex shaft 146 the series of mounting holes 152 on successive discs will be rotated 30° in relationship to each other and when the tines 22, 24 are secured by means of bolt 154 to the mounting holes 152 the tines will be properly rotationally indexed across the lateral width of the shaft member 16 without any further adjustment being required.

It will be particularly noted that the tines 22, 24 are generally L-shaped in configuration to provide a shank part 158 and a laterally extending tooth part 160 with a beveled leading edge 162 extending across the tooth part 160 and partly along the side of the shank part 158. Two sets of identical but oppositely constructed tines are required for each disc with the tines being arranged in alternate relationship so that the teeth thereof extend in opposite directions. The tines are connected to the discs with the shank part on one side of the disc and the tooth 158 extending laterally over the periphery of the disc in the direction of its opposite side. This arrangement lends great support to the tines inasmuch as any tendency of the tines to bend inwardly over the discs is resisted by the outer peripheral edge of the disc 18 and this would not be the case were the shanks 158 to be bolted to the disc on the same side as the direction in which the teeth extend.

By providing the mounting holes 152 through the discs in the aligned, somewhat tangential relationship shown, not only is considerable supporting metal provided for the tines inwardly of the disc periphery, but also maximum strength is provided to resist any shear forces exerted on the disc as the tines are driven through particularly heavy soil. The series of aligned holes 152 also permit the mounting of tines of different lengths or permit the inward or outward adjustment of tines on the respective discs to achieve varying row effects. Thus if it is desired to produce longitudinal rows, the tines on say the second and third discs to the left and right of the gear box 118 could be connected to the inner holes while the tines on the remaining discs could be connected to the outer holes with the result that the shorter tines would dig less deeply into the soil than the longer tines thereby producing elevated rows.

One of the obstacles to mounting the gear box of a rotary tiller in the optimum position in alignment with the P.T.O. shaft and at the mid point of the disc axle has been the fact that the gear box has prevented the teeth from reaching the soil beneath the box so that a strip of untilled ground remains. The present invention effectively overcomes this problem by making the sloping housing 114 for shaft 112 laterally very narrow and by suspending the gear box from the afore-described double ended support member 124 is constructed, as shown in FIG. 9, of two arcuate sheets 124a, 124b welded along their abutting vertical edges to provide a flattened tubular structure which is laterally quite narrow while being immensely strong. As can be seen in FIG. 8 this permits the tine teeth 160 extending in the direction of the support 124 and housing 114 to pass very close to these members over the top of the gear box 118. However, because the confronting faces of the teeth must be spaced sufficiently far apart to clear the support and housing, the aforementioned overlapping paths in the soil cannot be achieved, but it has been discovered that substantially the identical results can be produced by providing a non-dirigible coulter wheel 162 which operates ahead of the gear box 118 but in close adjacency thereto. It has been found that as the coulter wheel 162 slices the earth directly ahead of the confronting teeth of the innermost tines, a line of weakness is produced in the earth which enables the teeth to break apart the earth on opposite sides of the coulter 162 as they move beneath the gear box so that the earth under the gear box is as thoroughly pulverized as is the earth engaged by the teeth on all of the other discs. The coulter wheel 162 is carried on a standard 164 whose upper end is rigidly fixed to the lower surface of the deck 10. A series of vertically aligned holes are provided in the standard 164 so that the coulter wheel can be vertically adjusted if desired in accordance with prevailing conditions.

Desirably, the rear of the implement is provided with a hinged door 168 which may be adjusted in various positions by means of a chain 170. The purpose of the door 168 is to control the degree to which the earth may be fluffed by the action of the blade. For example, when the door is closed a considerable portion of the earth is temporarily retained within the implement so as to be repeatedly pulverized and aerated. When the door is in its fully open position as indicated by the dotted lines the worked earth is expelled rearwardly almost immediately.

In lieu of the flexible coupling previously described, the drive means illustrated in FIGS. 13 through 16 may be employed. In FIG. 13, it will be noted that the universal joint 72a, corresponding to the universal joint 72 in FIGS. 1 and 4, is directly connected to the universal joint 93a, corresponding to joint 93 in FIGS. 1 and 4, through a unitary shaft 82a which takes the place of the flexible coupling 82 illustrated in FIG. 1. The input side of the universal joint 72a is splined to a short stub shaft 198 rotatably mounted in a pillow bearing 200 fixed to the top deck 10 of the body in substantially the same position as the rear of the two bearings 70, illustrated in FIG. 1. The stub shaft 198 is in spaced axial alignment with a second stub shaft 202 rotatably mounted in a second pillow block 204 and carrying at its forward end the output side of a universal joint 206 whose input side is operatively connected to the P.T.O. shaft. The two stub shafts 198, 202 are driveably interconnected through a novel torque limiting clutch generally indicated by the numeral 208 in FIG. 13 and more particularly illustrated in FIGS. 14 through 16, which should now be referred to.

The limiting clutch 208 comprises an input member 210 substantially similar to a conventional brake drum having an annular friction part 212 and an inwardly extending flange 214 provided with an enlarged radially notched opening received over radially extending teeth 216 of a cylindrical member 218 splined to the forward end of the stub shaft 202. The member 218 and the drum 210 are prevented from moving axially forwardly with respect to shaft 202 by means of respective spring clips 220 and 222 and with particular reference to FIG. 15, it will be observed that the teeth 216 on the external surface of the member 218 define between them longitudinal channels having substantially flat bottoms 224 and upwardly and outwardly sloping sidewalls 226. Though the rear end of the longitudinal channels function as splines for the brake drum 208, the forward part of the channels receive longitudinally spaced hollow plungers 228 having nose parts 230 which are normally urged by springs 231 into engagement with the bottom surfaces 224 of the channels and are provided with opposed outwardly sloping camming surfaces 232 substantially complementary to the sidewalls 226 of the channels. The plungers 228 are slideably received in radial openings 234 extending through an annular part 236 which extends between the center grooved member 218 and the internal surface of the friction part 212 of the brake drum 208.

The annular part 236 is integral with a cylindrical member 238 centrally splined to the rear stub shaft 198, a retaining ring 240 preventing axial movement of the member 238 rearwardly with respect to stub shaft 198. It will also be observed that the forward and rear ends 242, 244 of the respective shafts 198, 202 are enlarged and are slideably received in an enlarged central opening 246 in the member 218 with the shaft 198 being grooved to receive a spring clip 248 which serves both as a forward abutment for the member 238 and as a rear abutment for the central member 218. In addition, the member 218 may have a reduced diameter neck part 250 having an external groove receiving a spring slip 252 loosely received in an internal annular recess in a mating shoulder 254 of the member 238. It will be apparent that the members, as so far described, may be readily disassembled by removal of the spring clips 220, 240 and the internal spring clip 252 so that the parts of the clutch may be slid axially on the shafts 198, 202 away from each other. In order to effect removal of the internal clip 252, a longitudinal opening 256, normally closed by a dust cover 258, is provided in the member 238 as shown in FIGS. 14 and 16.

With particular reference now to FIG. 15, it will there be seen that the springs 231 in the plunger act outwardly on the internal surfaces of a plurality of radially spaced brake shoes 260 having tangs 262 at one end received in mating grooves on the exterior of the part 236 of member 238. Bonded to the outer surface of the shoes 260 are brake pads 264 which are at all times urged by the springs 231 into frictional braking engagement with the internal surface of the friction part 212 of the drum 208.

In normal operation, as the input stub shaft 202 is positively driven by the P.T.O. shaft the brake drum 208 is likewise positively driven and, so long as there is no unusual resisting load on the transverse blade carrying shaft, the output stub shaft 198 is driven with the input shaft when the appropriate camming surface 232 of the plungers 228 engage the mating sloping sidewalls 226 of the longitudinal grooves in the member 218. Should a greater than usual obstruction be encountered by the blades of the tiller, the additional torque on the transverse shaft will be reflected in a tendency of the output stub shaft 198 to be slowed down relative to the input shaft 202. Upon this occurrence the sloping sidewalls 226 of the longitudinal teeth 216 in the member 218 exert a camming action on the cam surfaces 232 of the plungers to urge these radially outwardly so as to press the brake lining 264 into tighter frictional engagement with the brake drum 212. For the average obstruction, this additional frictional engagement will be sufficient to move the transverse shaft through the obstruction, but should the obstruction be solid and simply will not yield despite the increased frictional engagement between the shafts, then the nose parts of the plungers will ride over the tops of the teeth 216 and will produce a pronounced clicking sound which immediately notifies the operator of an unusual overload condition caused by hidden obstructions in the ground. At this juncture, the operator would actuate the three point lift to raise the entire implement free of the obstruction or he would investigate to determine the source of the overload. When normal conditions prevail, the plungers will again settle down in the grooves and work can proceed. It should be noted that because the camming surfaces of the plungers and grooves are symmetrical the overload clutch arrangement is effective regardless of the direction of rotation of the input shaft.

In use, after the tiller of the invention has been connected to the tractor, and the operator has set the depth control wheels 46 for the desired depth of till, he commences operation by engaging the P.T.O. shaft gearing to drive the stub shaft 56 and hence the hex shaped transverse shaft 146 through the previously described sprocket chain drive. In the event that the operator is dissatisfied with the speed of operation of the blades, after stopping the tractor and disconnecting the P.T.O. shaft he then merely removes the cover 101 from the housing 100 and quickly and easily lifts off the sprocket wheels 104, 108 which, as previously mentioned, are held on their splined shafts by the action of gravity and he then merely substitutes for the sprocket wheels 104, 108 another set of wheels providing a different gear ratio, either greater or less depending upon conditions. Normally, the sprocket wheel ratios are selected so that no change in the length of the sprocket chain is required, but in the event that a ratio is desired which cannot be achieved by a selected pair of wheels, the sprocket chain can be so constructed as to provide means whereby one or more links may be easily added or removed from the chain.

The change of speed ratio is a normal part of the operation of rotary tillers and with the provision of means whereby the sprocket wheels are retained in place solely under the action of gravity, it will be apparent that the necessity of laboriously removing keys or other sprocket wheel retention devices is entirely eliminated so that a change in gear ratio can be effected in the arrangement of the present invention in a matter of minutes whereas in prior tillers a change in gear ratio could often be accomplished only after hours of difficult labor.

The second embodiment of the invention illustrated in FIGS. 11 and 12 so far as the basic mechanisms hereinbefore described are concerned is substantially identical and will not be further described, it being noted that like reference characters for like parts are the same in both embodiments. The significant distinction between the embodiment of FIGS. 11 and 12 over the first embodiment, is the provision of an elongated, hollow watertight roller 300 which extends laterally across the entire width of the implement. The drum is of sleeve-like construction and may have a central shaft 302 extending through a plurality of laterally spaced circular webs 304 so as to provide a rigid skeleton for the cylindrical sheet material which forms the roller. The ends of the roller are closed by coulter wheels 306 which serve to cut vines, weeds and trash that might tend to wrap around the ends of the transverse blade carrying shaft and they also serve to cut a clean furrow wall for the outside blades of the transverse shaft. In addition to the end coulters 306 a center coulter 308 is provided which serves the same function as a coulter 162 already described in connection with the first embodiment; that is to say, the center coulter cuts the soil immediately ahead of the gear box support so that the center blades which operate around the gear box can thoroughly treat the soil without leaving an untilled gap beneath the gear box. The center coulter can comprise an externally radial flange welded to the exterior of the roller or if desired, it can be fixed to the central shaft 302 as shown to extend radially outwardly through the roller. In any event fluid tight welded beads would be applied at the abutting edges of all of the coulter elements and the external surface of the roller.

The roller assembly is pivotally mounted at its opposite ends on stub shafts 310 received in the outer ends of lever arms 312 whose inner ends are pivoted to stub shafts 314 mounted in bracket members 316 fastened to the sidewalls 12, 14 of the implement and in co-axial relationship with the transverse blade shaft. It will be seen that with this arrangement as the lever arm 312 is pivoted about the stub shafts 314 the radial spacing of the axis of the roller from the axis of the transverse shaft will at all times remain the same.

Because the roller serves primarily as a depth control for the blades, vertical adjustment of the roller is afforded by means of a hydraulic motor 318 which may be controlled from the tractor to extend or retract a piston rod 320 whose outer end is pivotally connected to one end of a lever 322 whose opposite end is connected to a rock shaft 324 mounted in suitable bearing brackets 326 fixed to the top deck 10 of the implement. The rock shaft 324 has fixed to its ends short lever arms 328 whose outer ends are pivotally connected to the upper ends of links 330 whose lower ends are pivotally connected to the lever arms 312 intermediate the ends thereof. It will be apparent that when the piston rod 320 is retracted the link 330 will be raised thus raising the roller 300 to permit the blade to operate at an increased depth whereas outward movement of the piston rod 320 will have a reverse effect. As can be seen in FIG. 11, the forward end of the hydraulic motor is pivoted to a removable bracket 340 fixed to the transverse accessory mounting shaft 30 previously described in connection with the first embodiment. In like manner it will be noted that the bearing brackets 326 and the stub shafts brackets 316 are readily detachable so that all of the parts which differentiate the second embodiment just described from the first embodiment can be removed and the implement can be readily converted to the first embodiment.

The particularly desirable features of the roller 300 are that it serves to push over tall grass and weeds immediately ahead of the blades so that the blades may thoroughly chop up the grass and weeds instead of pulling them through in whole clumps as can occur in some instances where vegetation is markedly dense and has root structures of a depth considerably greater than normal. By mounting the roller so that it operates just ahead of the blades not only does the roller cooperate with the blades by bending over tall vegetation but also the blades, as they rotate, cooperate with the roller to retain it clear of material which otherwise might stick to or become wrapped around the roller.

The roller is made water tight because of its particular efficacy in working rice fields where the roller affords a measure of flotation to the implement to insure that it does not sink excessively into the marsh-like soil. Additionally, the roller serves as a guard means to prevent the accidental tearing away of levee walls when the implement crosses over these when working rice fields. In addition to these features, the roller serves to smooth uneven ground which may have been ridged by prior implements, as for example by combines, and in particular it provides uniform depth control across the entire width of the implement which is particularly advantageous in working uneven or furrowed ground where a single or a pair of depth control wheels might ride intermittently on or in the peaks and valleys, resulting in a non-uniform depth of till.

Rotary tillers as shown and described have been constructed and have produced, under rigid tests, results superior to any tiller known to the trade. It is believed that one of the prime reasons for the success of the tiller is the fact that the power from the P.T.O. shaft is transmitted to the disc carrying shaft substantially in alignment with the P.T.O. shaft and substantially at the center of the disc carrying shaft. With this arrangement the resisting torque exerted by the blades remote from the centrally mounted gear box 118 is approximately one-half the torque exerted on a shaft which is driven from one end only. Furthermore, because the shaft has at least a three bearing support one of which is located at the mid part thereof, any tendency of the shaft to whip is eliminated and the length and speed limitations imposed on a lateral shaft which is supported at its end only, as heretofore, is entirely removed. Thus the invention can work more rugged ground at a greater acreage-per-day rate than has heretofore been considered possible.

A further desirable feature of the invention is the provision of means for mounting auxiliary equipment directly onto the tiller so that it is possible for an operator to work his acreage as well as seed it or perform other operations in a single operation. This is not possible with any known rotary tiller presently in use.

It will be apparent to those skilled in the art that the tiller or plow of the invention is susceptible of a wide variety of changes and modifications without, however, departing from the scope and spirit of the appended claims.

What is claimed is:

1. A rotary tilling implement comprising a frame including a top deck and a pair of downwardly extending, laterally spaced side members, a rotatable shaft extending laterally between said side members below said top deck with the ends of said shaft supported by said members, a plurality of laterally spaced discs fixed to said shaft, circumferentially spaced ground working tines carried by said discs, said tines extending beyond said discs and having teeth at the outer ends thereof, the teeth on alternate tines extending substantially laterally in opposite directions, a gear box disposed centrally of said shaft and including gearing driveably connected to said shaft, mounting means for said gear box including a narrow support interposed between and rigidly fixed to the underside of said deck and the upper side of said gear box, a longitudinally arranged shaft extending rearwardly from said gear box and drivably connected at its forward end with said gearing in said gear box, bearing means fixed to said frame for rotatably supporting said shaft, a second longitudinally arranged shaft rotatably carried on the upper side of said deck and having a rear end extending rearwardly beyond said transverse shaft and having a forward end adapted to be connected to a source of power, the rear ends of the respective shafts lying substantially in the same transverse plane normal to the axes of said first and second shafts, and endless flexible drive means drivably interconnecting the respective rear ends of said first and second shafts.

2. The implement of claim 1 including a non-dirigible coulter wheel fixed to said frame ahead of said gear box in substantial alignment with said support.

3. A rotary tilling implement comprising a frame including a substantially horizontal top part having laterally spaced, downwardly extending side parts, means carried by said frame for releasably attaching said implement to a tractor vehicle, rearwardly extending drive shaft means journalled to and carried by the upper side of said top part substantially midway between and parallel with said side parts, said drive shaft means having a substantially horizontal front end part and rear end part which slopes rearwardly and upwardly with respect to said front end part, universal joint means interconnecting said front and rear end parts, a driven shaft adapted to carry earth working implements and extending laterally beneath said top part with its opposite ends journalled in the side parts of said frame, means carried by the front end part of said drive shaft means for operatively connecting the same with a source of power, a second upwardly and rearwardly extending shaft journalled to said frame beneath said top part and having a front end part adjacent said transverse shaft and a rear end part, said second shaft being substantially parallel to the rear end part of said drive shaft means and located in said frame beneath said top part so that the axis thereof lies in substantially the same vertical plane as the axis of said drive shaft means, means drivably connecting the front end part of said second shaft to said transverse shaft, wheel means carried by the rear end parts of said drive shaft means and said second shaft, and an endless flexible element drivably interconnecting said wheel means.

4. The implement of claim 3 wherein said wheel means and the outer ends of said shafts are splined and said wheel means are retained on said shaft ends solely under the influence of gravity.

5. The implement of claim 3 wherein said wheel means are sprocket wheels and wherein said endless flexible element is a sprocket chain.

6. A rotary tilling implement adapted to be secured to the rear of a tractor vehicle comprising a frame having a horizontal top part and laterally spaced downwardly extending side parts, a transverse implement carrying shaft rotatably journalled at its opposite ends in said side parts, and means for driving said shaft from a position substantially midway between the ends thereof, said driving means comprising a drive shaft journalled to the upper side of said top part, a second upwardly and rearwardly sloping shaft rotatably journalled on the upper side of said top part, a third rearwardly and upwardly sloping shaft parallel to the second shaft and journaled to said frame below said upper part, said second and third shafts lying in the same vertical plane, each of said shafts having a front and a rear end, universal joint means interconnecting the front end of said second shaft with said drive shaft, gear means operatively interconnecting the front end of said third shaft with the midpoint of said transverse shaft, a pair of sprocket wheels drivingly carried on the ends of said second and third shafts and endless sprocket chain engaging said sprocket wheels.

7. The implement of claim 6 wherein said sprocket wheels are axially retained on the rear end of said shafts solely under the influence of gravity whereby said wheels may be quickly removed for replacement by wheels affording a different ratio.

8. A rotary tilling implement comprising a frame having front and rear ends, means at the front end of said frame for attaching said implement to a tractor vehicle, said frame including a top deck part having laterally spaced downwardly extending side parts, rearwardly extending drive shaft means journalled to and carried by and above the upper side of said top deck part between and parallel with said side parts, said drive shaft means having a front end part and a rear end part, a driven shaft adapted to carry earth working implements and extending transversely beneath said top deck part with its opposite ends journalled in the side parts of said frame, means carried by the front end part of said drive shaft means for operatively connecting the same with a source of power carried by a tractor vehicle, a second shaft journalled to said frame beneath said top deck part and having a front end part adjacent said transverse shaft and a rear end part extending rearwardly away from said transverse shaft between and parallel with said side parts, means drivably connecting the front end part of said second shaft to said transverse shaft, wheel means carried by the rear end parts of said drive shaft and said second shaft, and an endless flexible element drivably connecting said wheel means.

References Cited by the Examiner
UNITED STATES PATENTS

| | | | |
|---|---|---|---|
| 410,279 | 9/1889 | Heywood | 74—219 |
| 1,059,158 | 4/1913 | Henton | 172—125 X |
| 1,418,342 | 6/1922 | Walton | 172—172 |
| 2,256,185 | 9/1941 | Ariens | 172—120 |
| 2,347,017 | 4/1944 | Ariens | 172—172 |
| 2,442,731 | 6/1948 | Paul | 172—125 |
| 2,477,662 | 8/1949 | Seaman | 172—556 |
| 2,528,477 | 10/1950 | Rugh | 192—56 |
| 2,723,014 | 11/1955 | Locke | 192—56 |
| 2,754,744 | 7/1956 | Hall | 172—556 |
| 2,830,515 | 4/1958 | Zayco | 172—108 X |
| 2,940,534 | 6/1960 | Chattin | 172—125 X |
| 2,943,687 | 7/1960 | Merry et al. | 172—125 |
| 2,957,529 | 10/1960 | Kaller | 172—120 |

FOREIGN PATENTS

| | | |
|---|---|---|
| 172,222 | 8/1952 | Austria. |
| 1,011,208 | 6/1957 | Germany. |
| 821,349 | 10/1959 | Great Britain. |
| 597,978 | 9/1959 | Italy. |
| 198,630 | 9/1938 | Switzerland. |
| 207,853 | 3/1940 | Switzerland. |

ABRAHAM G. STONE, *Primary Examiner.*